Jan. 21, 1969
P. E. GOODALE
3,423,601
PULSE TESTING APPARATUS FOR TESTING
A DEVICE WITH CURRENT PULSES
Filed Jan. 3, 1966
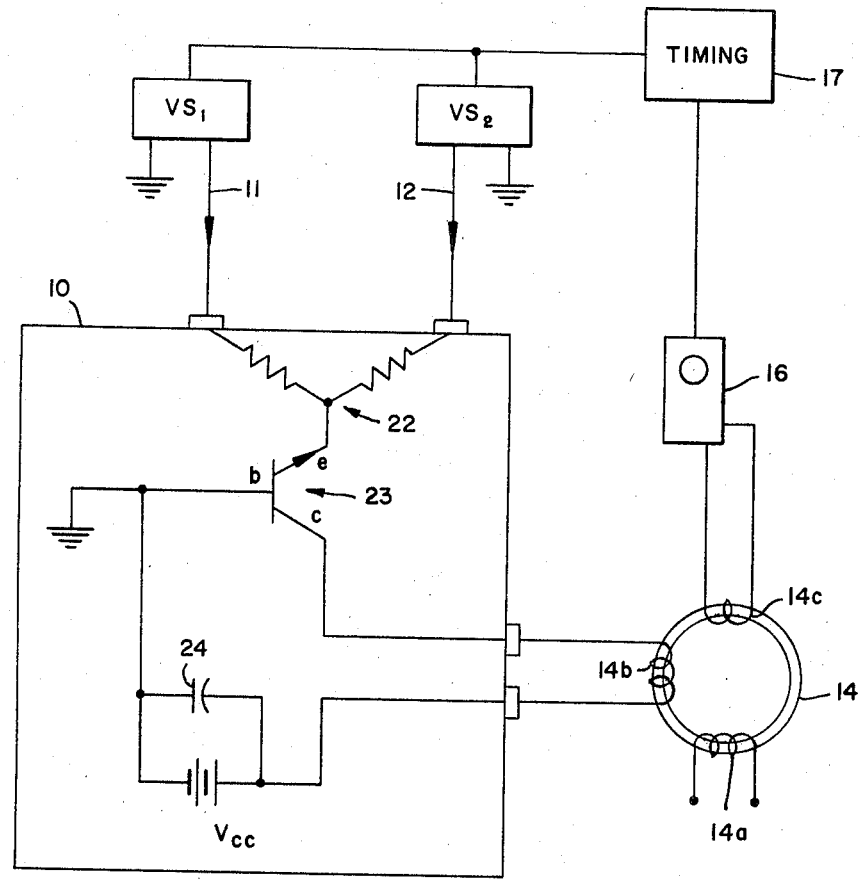
FIG_1
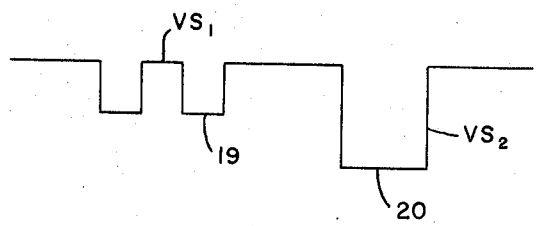
FIG_2
INVENTOR.
PAUL E. GOODALE
BY
*Filek and Swain*
ATTORNEYS

United States Patent Office 3,423,601
Patented Jan. 21, 1969

3,423,601
PULSE TESTING APPARATUS FOR TESTING A DEVICE WITH CURRENT PULSES
Paul E. Goodale, Pleasant Hill, Calif., assignor to E-H Research Laboratories, Inc., Oakland, Calif., a corporation of California
Filed Jan. 3, 1966, Ser. No. 518,121
U.S. Cl. 307—270         1 Claim
Int. Cl. H03k 3/26

ABSTRACT OF THE DISCLOSURE

A pulse testing apparatus for testing a device under test such as a magnetic core with current pulses. Voltage pulses are supplied by a plurality of voltage sources cabled to a voltage to current pulse converted. The converter includes a resistive adding circuit coupled to the emitter of a transistor. The base of the transistor is grounded and also coupled to a common potential source and the collector is coupled to the device to be tested. The resistive adding circuit substantially terminates the cabling from the voltage sources to the ground through the low base to an emitter impedance of the transistor to thus eliminate reflections. The high impedance between the base and collector serves to isolate the transmission line from the base collector circuit. The device to be tested is coupled to the converter in relatively close proximity to eliminate cabling capacitance. A current pulse is supplied to the device under test when the transistor of the converter is actuated by a voltage pulse.

---

The present invention is directed to current pulse apparatus, and more particularly to apparatus responsive to voltage pulses for supplying current pulses.

The testing of the response of electronic components, such as, for example, ferrite cores used in computer memories to input pulses, requires that the testing circuits have a high frequency capability in order to minimize the effect of the circuit itself on the results obtained. In some applications where several different types of pulses are necessary for testing, several test pulse generators are connected in parallel to drive the electronic component. Where a multiplicity of equipment is used, cables interconnecting the pulse sources and the component have distributed resistance, inductance and capacitance which distorts the pulses. For example, where current drivers are used, a coaxial type coupling is made between the component and drivers. This cable, at the higher testing frequencies, may cause time delays and reflections in the circuit seriously decreasing the reliability of the test results. Even in the case where voltage sources are used, lead inductance is still a problem at the higher frequencies. In addition, where voltage sources are used, series resistors are required to limit the current through the component to be tested since components, such as a ferrite core, usually have a relatively low impedance.

It is an object of this invention to provide an improved current pulse apparatus.

A further object of the invention is to provide a current pulse apparatus adapted to be placed in close proximity to the electronic component to be tested which is responsive to voltage pulses from a remote voltage source.

It is another object of the invention to provide a current pulse apparatus which allows many paralleled pulse generators to drive an electronic component.

It is another object of the invention to provide current pulse apparatus which has minimum inductance and capacitance to provide high frequency response.

It is still another object of the invention to provide a current pulse apparatus which allows the use of a plurality of voltage sources for driving a current load.

In accordance with the above objects, the invention is characterized by a current pulse apparatus of the type responsive to voltage pulses for supplying current pulses, and includes an adding circuit and a transistor having emitter, base and collector terminals. The base is coupled to ground. The adding circuit is coupled to the emitter of the transistor. Means are also provided for coupling a device to be tested in the collector lead. Upon activation of the emitter by a voltage pulse, a current pulse is thereby supplied to the device.

Further objects and features of the invention will appear from the following description in which the preferred embodiment of the invention has been set forth in detail in conjunction with the accompanying drawing.

Referring to the drawing:

FIGURE 1 is a schematic circuit diagram showing an improved current pulse apparatus embodying the present invention; and FIGURE 2 shows typical test pulses which would be supplied to one type of device to be tested.

FIGURE 1 illustrates a testing system including a current pulse apparatus embodying the present invention designated as 10. Feeding the apparatus 10 are voltage sources designated $VS_1$ and $VS_2$. The voltage sources are individually grounded and coupled to the current pulse apparatus by means of transmission lines 11 and 12, respectively. The voltage pulses are converted by the current pulse apparatus into a current pulse which then drives the electronic component 14 to be tested. In the present embodiment, the component comprises a ferrite memory core 14. Core 14 includes a write winding 14a, a read winding 14b to which the output of current pulse apparatus is coupled, and a sensing winding 14c.

A convenient monitoring device, such as an oscilloscope 16, is coupled to sensing winding 14c. The individual voltage pulses from the voltage sources and the oscilloscope are controlled by a central timing circuit 17 to which all of these devices are coupled.

FIGURE 2 illustrates the type of voltage pulse output which would normally be used for testing ferrite core 14. Such cores have two stable states, each of which corresponds to the "0" or "1" of the binary number system used in computers. The resistance to spurious disturbances or a "half select" pulse which might switch the core to its other condition is tested by disturbing pulses 19 from $VS_1$ which tend to cause the core to switch to its other condition. Subsequent application of a read pulse 20 from $VS_2$ switches the core if it is operating properly.

Referring now specifically to the current pulse apparatus 10, there is provided an adding circuit 22 which combines the input from the transmission lines 11 and 12. The common output of this adding circuit is coupled to the emitter of a transistor 23. The base of the transistor is grounded. Base collector bias is provided by a battery, or unidirectional voltage source, $V_{cc}$. A capacitor 24 provides a high frequency bypass around the battery. Ferrite core winding 14b is coupled in series with the collector of transistor 23.

Operation

In use, the current pulse apparatus 10 is located in close proximity to the electronic component 14 to be tested in order to minimize effects of inductance and capacitance in the leads coupling the two devices. On the other hand, voltage sources, $VS_1$ and $VS_2$, may be coupled by means of transmission lines from a relatively remote location.

Transistor 23 is activated by a negative pulse which is applied through the adding circuit 22 to the emitter which reduces the forward bias between the emitter and base.

The transistor then delivers a current pulse to ferrite core 14. Since a ferrite core will ordinarily be magnetized in its "1" or "0" state, the core is placed in a predetermined state, such as "1," before testing. Application of a current pulse, such as 20, to read winding 14b, which is of sufficient magnitude, changes the magnetic state of the core inducing a pulse in sense winding 14c. If the disturbing pulses 19 have previously switched the core, no flux change will occur and therefore no voltage pulse will be induced in winding 14c. This indicates a defective core.

Because of the inherent characteristics of transistor 23, the base to emitter resistance is very low and therefore transmission lines 11 and 12 are effectively terminated to ground to eleminate all reflections. Moreover, the relatively high impedance between the base and collector serves to isolate the lines from the base collector circuit.

Thus, the present invention provides ideal matching of several voltage sources to an electronic device to be tested and allows a current source to be placed in close proximity to the device. With reduction of lead inductance and capacitance, relatively short rise times are achieved.

I claim:

1. Pulse testing apparatus for testing a device with current pulses comprising: a plurality of voltage sources for generating voltage pulses, a voltage to current pulse converter for converting said voltage pulses to current pulses, said converter including an adding circuit, a transistor having emitter, base, and collector terminals, the base to emitter impedance being relatively low and the base to collector impedance being relatively high, means coupling the base to a common potential source, means coupling said adding circuit to said emitter, transmission line means for coupling said voltage sources to said adding circuit of said converter, said voltage sources being physically located relatively remotely from said converter, said adding circuit substantially terminating said line means to said common potential source through said low base to emitter impedance to eliminate reflections, said high impedance between said base and collector serving to isolate said line means from the base collector circuit, and means for coupling said device to receive collector current, such means coupling said device in relatively close physical proximity to said converter whereby a current pulse is supplied to said device from said collector when said emitter is activated by a voltage pulse.

References Cited

UNITED STATES PATENTS

| | | | |
|---|---|---|---|
| 2,901,638 | 8/1959 | Huang | 307—88.5 |
| 2,994,003 | 7/1961 | Einsele et al. | 307—88.5 |
| 3,083,303 | 3/1963 | Knowles et al. | 307—88.5 |
| 3,235,754 | 2/1966 | Buelow et al. | 307—88.5 |
| 3,293,609 | 12/1966 | Martin | 340—172.5 |

ARTHUR GAUSS, *Primary Examiner.*

S. D. MILLER, *Assistant Examiner.*

U.S. Cl. X.R.

324—34; 307—88, 253, 314